Oct. 15, 1935.  S. GREENBERG ET AL  2,017,494

STEERING SYSTEM LOCK

Filed May 31, 1934

INVENTORS.
Samuel Greenberg
William J. Tyler
By Threely and Cannon
THEIR ATTORNEYS Patented Oct. 15, 1935

2,017,494

UNITED STATES PATENT OFFICE 2,017,494

STEERING SYSTEM LOCK

Samuel Greenberg and William J. Tyler, Chicago, Ill.

Application May 31, 1934, Serial No. 728,291

5 Claims. (Cl. 70—90)

This invention relates to steering system locks for automobiles or the like and has for its principal object the provision of an improved construction of this character which will be highly efficient in use and economical in manufacture.

Among the several objects of the invention is the provision of a lock for steering systems of automobiles or the like whereby to prevent theft or unauthorized use of the vehicle.

Another object of the invention is the provision of a steering system lock which is of a structure such that the elements connecting the several parts of the lock together are concealed, thereby preventing the unauthorized removal of the lock to effectuate operation of the steering mechanism.

A still further object of the invention is a provision of a steering system lock for an automobile or the like whereby the means for connecting the parts of the lock together are concealed by a cap which is capable of being removed only when the steering system is capable of operation.

Other objects will appear hereinafter.

The invention consists in the combination and arrangement of parts hereinafter described and claimed.

The invention will be best understood by a reference to the accompanying drawing, illustrating the preferred form of construction of the same and in which.

Figure 1:
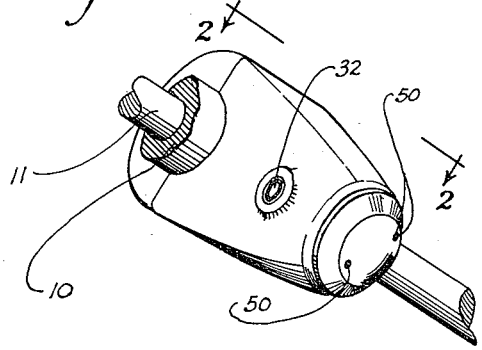
Fig. 1 is a fragmentary view of a steering column showing our invention associated therewith.
Figure 2:
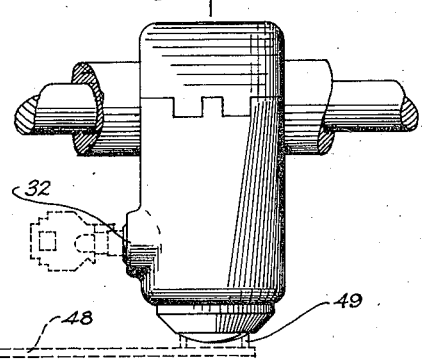
Fig. 2 is a side view of the same taken substantially on line 2—2 of Fig. 1.

Referring particularly to the drawing, in which the preferred form of the construction of the invention is illustrated, a steering column of an automobile or the like, is indicated at 10 and the column includes the usual shaft 11. It is this shaft 11 which is intended to be locked against operation so as to prevent unauthorized use of the vehicle with which the steering system is associated.

Figure 3:
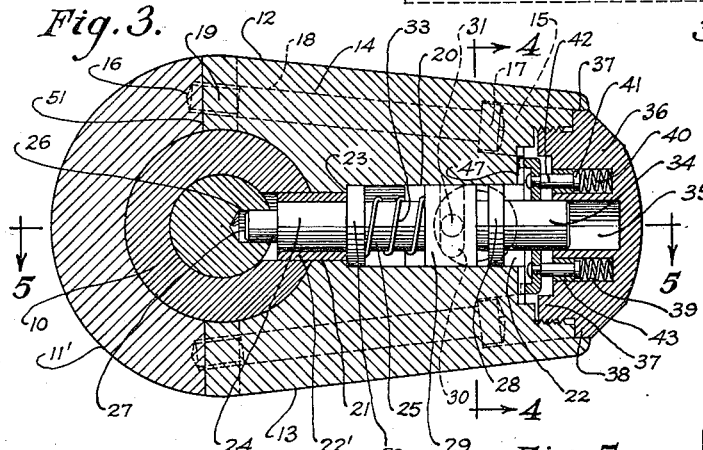
Fig. 3 is a sectional detail view of the same taken substantially on line 3—3 of Fig. 2.
Figure 4:
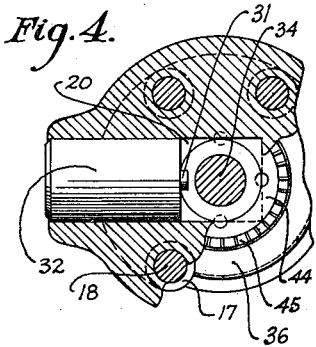
Fig. 4 is a fragmentary sectional detail view of the same taken substantially on line 4—4 of Fig. 3.
Figure 6:
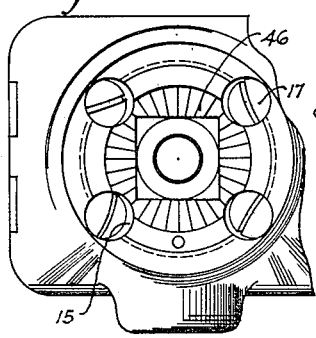
Fig. 6 is a fragmentary detail view of the same taken on line 6—6 of Fig. 5.
Figure 5:
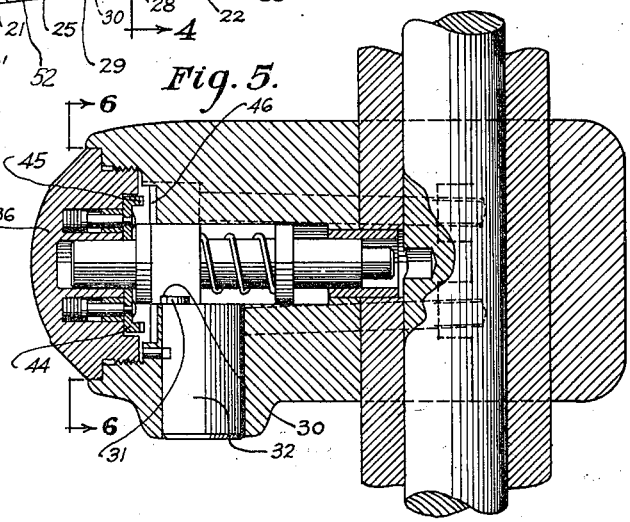
Fig. 5 is a sectional detail view of the same taken substantially on line 5—5 of Fig. 3.

To accomplish this we provide a body 12 which is a two part structure comprising a section 11' which is adapted to embrace the steering column 10 at one side thereof as shown in Fig. 3, and a section 13 adapted to embrace the steering column on the opposite side and which section 13 is adapted to have confined therein the lock mechanism to be presently described.

Formed in the body section 13 are a plurality of substantially longitudinally extending openings 14 the outer ends of which terminate in enlarged recesses 15 and the inner ends of which are adapted to register with thread bearing openings 16 formed in the body section 11'. Mounted in these openings 14 with their head portions 17 confined in the recesses 15 are bolt elements 18 having their outer end portions threaded into the thread bearing openings 16 whereby to effectuate connection between the body section 11' and the body section 13 in a predetermined fixed position upon the column 10.

Formed in the body section 13 is a medial recess 20 the inner end of which terminates into a reduced opening 21 and the outer end into a recess 22. Mounted in the reduced opening 21 is a bushing 22' which provides together with the body section 13 a shoulder 23. Slidably mounted in the bushing 21 is a cylindrical medial portion 24 of a latch bolt 25 the inner end of which provides a latch pin 27 which is adapted to engage into a recess 26 formed in the shaft 11. Forwardly of the portion 24 there is provided on the latch bolt 25 a shoulder 52 which is adapted to engage the shoulder 23 and thereby limit movement of the latch bolt 25 in latch engaging direction.

Adjacent the outer end of the latch bolt 25 is a circular flange 28 preferably fixed or formed integrally with the latch bolt 25. Between the shoulder 27 and the flange 28 there is slidably mounted an operating block 29 which slidably operates in the recess 20 which recess is substantially square in cross section. This block 29 is provided with a groove 30 adapted to receive the operating pin 31 of the mechanism of a key operated lock 32 of any conventional design whereby upon operation of the lock mechanism the pin 31 will rotate and shift the block 29 against the action of a spring 33 disposed between the block and the shoulder 27, to effectuate movement of the latch bolt 25 into latched position with respect to the shaft 11.

The latch bolt 25 provides an outer end portion 34 which normally operates in a recess 35 formed in a closure cap 36. This closure cap 36 is provided with a reduced body portion 37 adapted to be threaded into the recess 22 as shown in Fig. 3 and when so threaded into this recess the enlarged portion of the closure cap 36, as indicated at 38, will fit into an annular groove 37 formed in the body section 13.

Formed in this closure cap 36 are a plurality of sockets 39 and mounted in these sockets 39 are springs 40 the corresponding ends of which engage the heads 41 of pins 42 which are slidably supported in bushings 43 fixed in the outer ends of the sockets. These pins carry at their outer end portions a disc 44 and this disc has a peripheral edge providing a plurality of teeth 45 which are adapted to have a latched engagement with teeth 46 formed on the surface 47 of the body section 13.

When the closure cap is in the position illustrated in Fig. 3 the teeth 45 of the disc will have latched engagement with the teeth 46 of the body section 13 and thereby latch this closure cap against movement in a direction to detach the same from the body section 13.

The annular flange 28 of the latch bolt 25 when the latch pin 27 is disposed from latched engagement with the latch recess 26 will engage the disc 44 and move the same against the action of the springs 44 in a direction to dispose the teeth 45 thereof from latched engagement with the teeth 46 whereby to permit removal of the closure cap for any reason. This removal of the closure cap 36 is facilitated by means of a tool 48 having a pair of spaced pins 49 adapted to engage in the sockets 50 formed in the cap 36.

From this description it will be manifest that as long as the cap 36 is in latched position access to the bolts 14 cannot be had and consequently these bolts are concealed from view and therefore cannot be tampered with to allow unauthorized removal of the lock and consequently unauthorized operation of the steering system.

The abutting edges 51 of the body section 11' and the body section 13 preferably have dovetail connection so as to prevent and resist the use of a hacksaw or the like in any unauthorized attempt to remove the lock.

While we have illustrated and described the preferred form of construction for carrying our invention into effect this is capable of variation and modification, without departing from the spirit of the invention. We, therefore, do not wish to be limited to the precise details of construction set forth, but desire to avail ourselves of such variations and modifications as come within the scope of the appended claims.

Having thus described our invention what we claim as new and desire to protect by Letters Patent is:

1. A locking device for a shaft, comprising a casing including sections or parts adapted to be detachably attached or assembled together so as to embrace the said shaft; means arranged within the said casing for detachably attaching or assembling said casing parts or sections together; one of said casing sections or parts having an opening formed therein; a closure member in said opening; a latch member in said casing adapted to have latching engagement with said shaft; a member slidably carried by said closure member and adapted to have latching engagement with one of said casing parts or sections so as to prevent movement of said closure member in said opening and removal of the same from said casing; means in said casing normally urging said second-named latch member into latching engagement with the said last-mentioned casing part or section; and key-controlled means in said casing for moving, at different times, said first-named latch member into latching engagement with said shaft and said second-named latch member out of latching engagement with the said second-named casing part or section against the action of said urging means.

2. A locking device for a shaft, comprising a casing including sections or parts adapted to be detachably attached or assembled together so as to embrace the said shaft; means arranged within the said casing for detachably attaching or assembling said casing parts or sections together; one of said casing sections or parts having an opening formed therein; a closure member in said opening; a latch member in said casing adapted to have latching engagement with said shaft; a member slidably carried by said closure member and adapted to have latching engagement with one of said casing parts or sections so as to prevent movement of said closure member in said opening and removal of the same from said casing; means in said casing normally urging said second-named member into latching engagement with the said last-mentioned casing part or section; and key-controlled means in said casing for moving, at different times, said first-named latch member into latching engagement with said shaft and said second-named member out of latching engagement with the said second-named casing part or section against the action of said urging means.

3. A locking device for a shaft comprising a casing adapted to embrace the said shaft and including a body having an opening formed therein; a closure member or cap removably mounted in said opening; a latch member in said casing adapted to have latching engagement with said shaft; said body including a portion having an annular row of teeth formed therein within said casing; a disc slidably mounted on or carried by said closure member and having an annular row of teeth formed therein; means normally urging said disc in a direction to dispose the said row of teeth thereon in latching engagement with the said row of teeth formed on said body portion so as to prevent movement of said closure member or cap in said opening; key-actuated means in said casing for moving said disc, against the action of said urging means, in a direction to move the said teeth thereon out of latching engagement with the said row of teeth on said body portion.

4. A locking device for a shaft comprising a casing adapted to embrace the said shaft and including a body having an opening formed therein; a closure member or cap threaded into said opening; a latch member in said casing adapted to have latching engagement with said shaft; said body including a portion having an annular row of teeth formed thereon within said casing; a disc slidably mounted on or carried by said closure member and having an annular row of teeth formed therein; means normally urging said disc in a direction to dispose the said row of teeth thereon in latching engagement with the said row of teeth formed on said body portion so as to prevent rotation of said closure member or cap in said opening; key-actuated means in said casing for moving said disc, against the action of said urging means, in a direction to move the said teeth thereon out of latching engagement with the said row of teeth on said body portion.

5. A device of the character described comprising: a housing or casing including a body having an opening therein; a closure member for said opening; a member movably mounted upon said closure member; means in said casing adapted to coact with said second-named member to latch said closure member against movement in said opening so as to prevent removal of the same from said casing; means carried by said closure member normally urging said second-named member into latching engagement with said first-named or latching means; and means in said casing for moving said second-named member out of latching engagement with said first-named or latching means so as to permit movement of said closure member in said opening and removal of the same from said casing.

SAMUEL GREENBERG.
WILLIAM J. TYLER.